(12) United States Patent
Haensgen et al.

(10) Patent No.: US 10,048,123 B2
(45) Date of Patent: Aug. 14, 2018

(54) ELECTRONIC DEVICE INCLUDING LIGHT DETECTION CIRCUIT

(71) Applicant: COOPER TECHNOLOGIES COMPANY, Houston, TX (US)

(72) Inventors: Gregg James Haensgen, Menomonee Falls, WI (US); James Derek Formea, Hartland, WI (US); Andrew John Sowada, Saint Paul, MN (US); Richard William Lucas, Zimmerman, MN (US); Kyle Heiden, Milwaukee, WI (US); Denis Sterjo, Cudahy, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 767 days.

(21) Appl. No.: 14/592,352

(22) Filed: Jan. 8, 2015

(65) Prior Publication Data

US 2016/0202116 A1    Jul. 14, 2016

(51) Int. Cl.
| | |
|---|---|
| *G01J 1/44* | (2006.01) |
| *H04W 52/02* | (2009.01) |
| *H04B 10/43* | (2013.01) |
| *H05B 37/02* | (2006.01) |

(52) U.S. Cl.
CPC .............. *G01J 1/44* (2013.01); *H04B 10/43* (2013.01); *H04W 52/0225* (2013.01); *H05B 37/0272* (2013.01); *Y02B 60/50* (2013.01); *Y02D 70/00* (2018.01)

(58) Field of Classification Search
CPC .......... H04W 52/0225; H05B 37/0272; H04B 10/43; G01J 1/44
See application file for complete search history.

(56) References Cited

U.S. PATENT DOCUMENTS

| | | | |
|---|---|---|---|
| 8,331,790 B2 | 12/2012 | Pederson et al. | |
| 8,638,036 B2 * | 1/2014 | Delnoij | H05B 37/0218 |
| | | | 315/149 |
| 2002/0012258 A1 | 1/2002 | Nagai et al. | |
| 2004/0071471 A1 | 4/2004 | Baker et al. | |
| 2006/0028156 A1 | 2/2006 | Jungwirth | |
| 2007/0065160 A1 | 3/2007 | Shinohara | |
| 2008/0310850 A1 | 12/2008 | Pederson et al. | |
| 2008/0320200 A1 | 12/2008 | Pederson et al. | |
| 2010/0054748 A1 | 3/2010 | Sato | |
| 2010/0244735 A1 * | 9/2010 | Buelow, II | H05B 35/00 |
| | | | 315/294 |
| 2011/0069971 A1 | 3/2011 | Kim et al. | |

FOREIGN PATENT DOCUMENTS

| | | |
|---|---|---|
| WO | 03/084102 A1 | 10/2003 |
| WO | 2008/065607 A2 | 6/2008 |

OTHER PUBLICATIONS

European Patent Office, "International Search Report and Written Opinion" (Corresponding PCT/US2016/012427, dated Apr. 29, 2016, 12 pp.

* cited by examiner

*Primary Examiner* — Georgia Y Epps
*Assistant Examiner* — Don Williams
(74) *Attorney, Agent, or Firm* — Eckert Seamans

(57) ABSTRACT

An electronic device including a component and a light circuit structured to detect light. The light circuit is structured to output a detection signal in response to detecting light and the detection signal is used to wake up or communicate with the component.

18 Claims, 3 Drawing Sheets

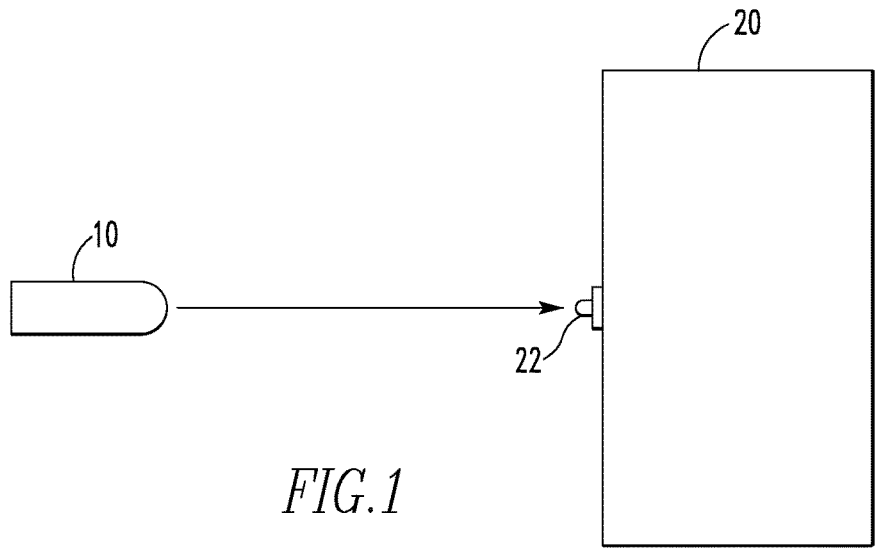
FIG.1
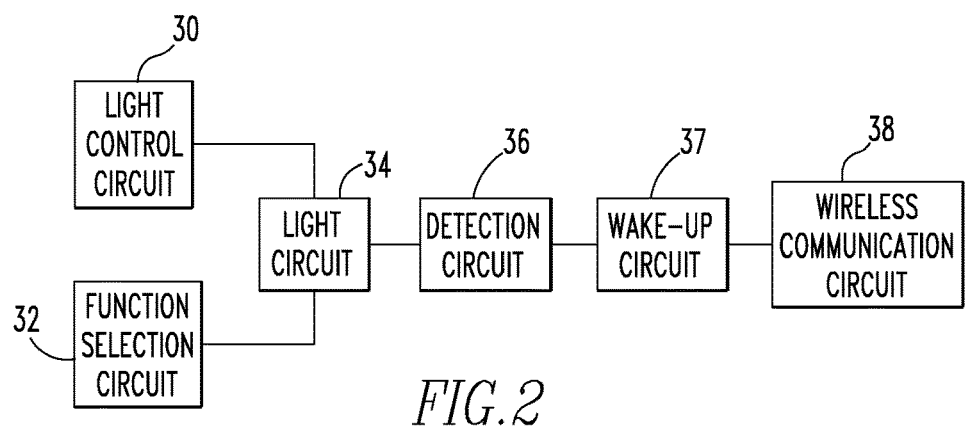
FIG.2
FIG.3

(12) United States Patent
US 10,048,123 B2

ELECTRONIC DEVICE INCLUDING LIGHT DETECTION CIRCUIT

BACKGROUND

Field

The disclosed concept relates generally to electronic devices, and in particular, to electronic devices that detect light.

Background Information

In power distribution systems, smart sensors may be used to monitor, for example, power distribution lines or capacitor banks. Some characteristics that smart sensors monitor include voltage, harmonics, and power factor. Smart sensors may also report outage events and alarm conditions. Existing smart sensors include a radio, such as a Bluetooth® radio, for use in configuration of various sensor parameters. During normal operation, the radio is powered off to conserve power, increase security, and comply with radio spectrum usage restrictions.

In order to activate the radio when it is turned off, the smart sensor includes a magnetically activated switch which, when actuated, causes the radio to wake up. To activate the magnetically activated switch, a magnet is placed on the outside of the smart sensor. A technician may place the magnet on the smart sensor or may use a tool such as a hot stick with the magnet attached. However, in either case, the process of placing the magnet of the smart sensor is time-consuming, which can add to costs for customers by requiring them to roll out a bucket truck to the location. Additionally, the smart sensors are generally used with energized conductors, and it is preferable to avoid putting the technician in proximity to the energized conductors.

There is room for improvement in smart sensors.

SUMMARY

These needs and others are met by embodiments of the disclosed concept in which an electronic device is configured to detect light and wakes up or communicates with a component based on the detected light.

In accordance with one aspect of the disclosed concept, an electronic device comprises: a component; and a light circuit structured to detect light, wherein the light circuit is structured to output a detection signal in response to detecting light, and wherein the detection signal is used to wake up or communicate with the component In accordance with another aspect of the disclosed concept, a method to wake up or communicate with a component of an electronic device comprises: providing the electronic device having a light circuit structured to detect light; detecting light with the light circuit; and waking up or communicating with the component based on the detected light.

BRIEF DESCRIPTION OF THE DRAWINGS

A full understanding of the disclosed concept can be gained from the following description of the preferred embodiments when read in conjunction with the accompanying drawings in which:

FIG. 1 is a schematic diagram of a light source and a light activated smart sensor in accordance with an example embodiment of the disclosed concept;

FIG. 2 is a schematic diagram of a light activated wireless communication circuit in accordance with an example embodiment of the disclosed concept;

FIG. 3 is a schematic diagram of a light communication circuit in accordance with an example embodiment of the disclosed concept;

DESCRIPTION OF THE PREFERRED EMBODIMENTS

Figure 4:
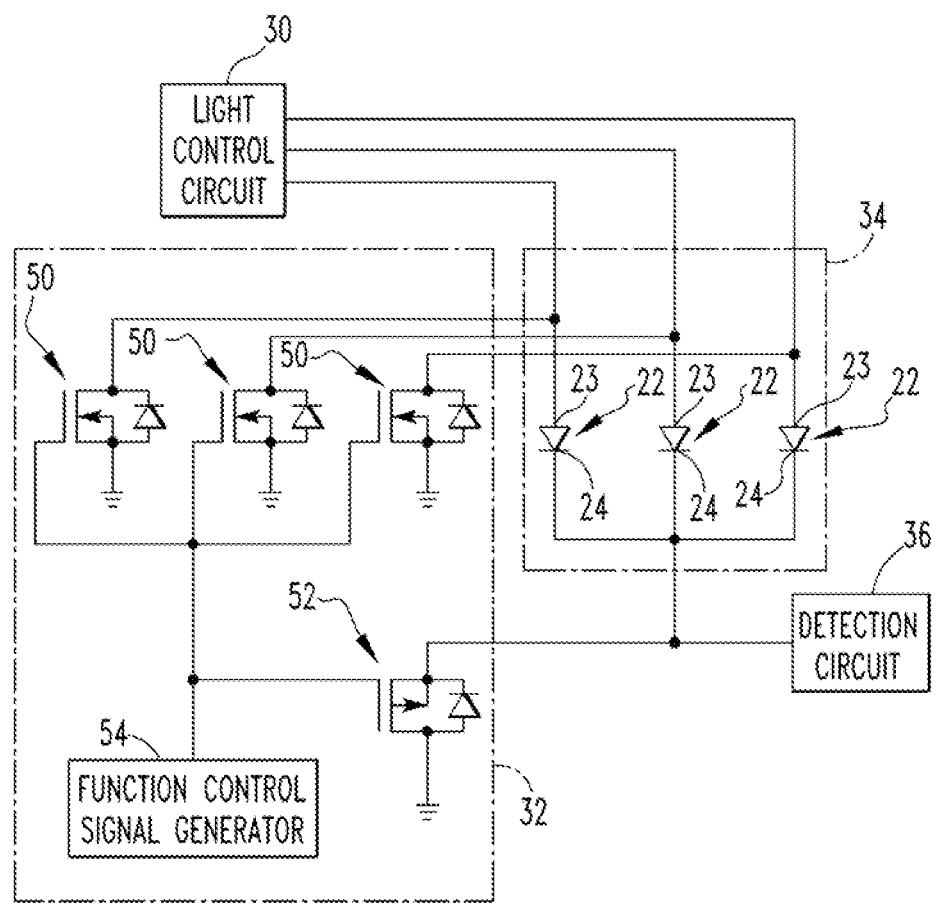
FIG. 4 is a circuit diagram of a light detection circuit in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the statement "wake up" when used in reference to an electronic device shall mean to power up or activate the electronic device from a powered off, low power sleep state, or other similar low power or powered off states.

Existing smart sensors include one or more light emitting diodes (LEDs) which are used to indicate the status of the smart sensor. While LEDs are generally only used to provide light, LEDs also have the capability to be used as light detectors. However, using LEDs as light detectors requires a different circuit configuration than when LEDs are used only as light sources.

FIG. 1 is a schematic diagram of a light source 10 and a smart sensor 20 in accordance with an example embodiment of the disclosed concept. The smart sensor 20 is suitable to monitor, for example, power distribution lines or capacitor banks. Some characteristics that the smart sensor 20 may monitor include voltage, harmonics, and power factor. To this extent, the smart sensor 20 includes one or more sensor devices (e.g., without limitation, a voltage sensor, a current sensor, etc.). The smart sensor 20 may also report outage events and alarm conditions and may include a communication unit to provide such reports.

The light source 10 is any suitable light generating device such as, without limitation, a laser. The smart sensor 20 includes an LED 22 disposed on the exterior of the smart sensor 20. It is contemplated that the LED 22 may also be disposed on the interior of the smart sensor 20 so long as it is accessible to light from the exterior of the smart sensor 20. The smart sensor 20 includes circuitry which allows the LED 22 to either generate light or to detect light, as will be described in more detail with respect to FIGS. 2-4. The smart sensor 20 is generally in a mode where the LED 22 is configured to detect light. However, when there is a need to use the LED 22 to light to provide a signal or indication, the smart sensor 20 briefly switches to a mode where the LED 22 is configured to generate light.

Referring to FIG. 2, a schematic diagram of a light activated wireless communication circuit in accordance with an example embodiment of the disclosed concept is shown. The light activated wireless communication circuit may be employed in the smart sensor 20 of FIG. 1.

The light activated wireless communication circuit includes a light control circuit 30, a function selection circuit 32, a light circuit 34, a detection circuit 36, a wake-up circuit 37, and a wireless communication circuit 38.

The light circuit 34 includes one or more light sources, such as the LED 22 shown in FIG. 1. The light circuit is capable of operating in a first mode in which it is configured to generate light and in a second mode in which it is configured to detect light. When LEDs are employed as the light sources, they can be used both to generate light and to detect light. In the case that another type of light source is used, the light circuit 34 may include both a light source and a separate light detector.

The light control circuit 30 includes circuitry for driving the light circuit 34 to generate light. The light control circuit 30 may include any suitable circuitry for driving the light circuit 34. The light control circuit 30 may include, for example and without limitation, a power source, an integrated circuit, and switches for driving the light circuit 34 to generate light. However, it will be appreciated that the light control circuit 30 may include any suitable circuitry for driving the light circuit 34.

The function selection circuit 32 controls the light circuit 34 to switch between the first mode and the second mode. In some example embodiments, when LEDs are used in the light circuit, the function selection circuit 32 ties cathodes of the LEDs to ground when the light circuit 34 operates in the first mode and ties anodes of the LEDs to ground when the light circuit 34 operates in the second mode. It will be appreciated, however, that the disclosed concept is not limited thereto. The function selection circuit 32 may switch the light circuit 34 between the first mode and the second mode in any suitable manner.

When the light circuit 34 operates in the second mode, it outputs a light detection signal which indicates when the light circuit 34 detects light. The detection signal is received by the detection circuit 36. The detection circuit 36 may perform any processing on the detection signal (e.g., without limitation, amplification, level shifting, etc.) to make it suitable for use in any subsequent circuitry.

Together, the light control circuit 30, the function selection circuit 32, the light circuit 34, and the detection circuit 36 form a light detection circuit which outputs a signal in response to detecting light, such as light from the light source 10 of FIG. 1.

The wake-up circuit 37 is configured to receive the signal from the detection circuit 36. In response to receiving the signal from the detection circuit 36, the wake-up circuit 37 outputs a wake-up signal to the wireless communication circuit 38 to activate the wireless communication circuit 38. The wake-up circuit 37 may include any suitable circuitry (e.g., without limitation, a processor, a field programmable gate array, a complex programmable logic device, or any other suitable analog or digital circuitry) to receive the signal from the detection circuit 36 and to output the wake-up signal.

It is also contemplated that the wake-up circuit 37 may be configured to wake-up the wireless communication circuit 38 in response to receiving a predetermined encoded pattern. Thus, a pattern of light pulses can be used similar to a password or login to activate the wireless communication circuit 38.

The wireless communication circuit 38 is configured to wirelessly communicate with an external wireless device. When the wireless communication circuit 38 is employed in the smart sensor 20 of FIG. 1 and is activated, the wireless communication circuit 38 may wirelessly communicate with the external wireless device to configure various parameters of the smart sensor 20.

The wireless communication circuit 38 is generally powered off. The wake-up signal from the wake-up circuit 37 causes the wireless communication circuit 38 to power on. Once the wireless communication circuit 38 is powered on, the external wireless device is able to communicate with it. The wireless communication circuit 38 may use any suitable protocol for wireless communication such as, for example and without limitation, Bluetooth®, wi-fi, any suitable wireless mesh protocol, any suitable cellular communication protocol, etc.

When the smart sensor 20 of FIG. 1 employs the light activated wireless communication circuit of FIG. 2, a technician can wake up the wireless communication circuit 38 by using the light source 10 at a distance from the smart sensor 20. This allows the technician to wake up the wireless communication circuit 38 and configure the smart sensor 20 without getting close to the smart sensor 20. Additionally, when LEDs are used as the light source in the light circuit 34, the light detecting capability can be added to the smart sensor 20 at a minimal cost.

FIG. 3 is a schematic diagram of a light communication circuit in accordance with an example embodiment of the disclosed concept. The light communication circuit includes the light control circuit 30, the function selection circuit 32, the light circuit 34, and the detection circuit 36, which have already been described with respect to FIG. 2. However, rather than the wireless communication circuit 38, the light communication circuit of FIG. 3 includes a control unit 40.

The light communication circuit of FIG. 3 may be included in the smart sensor 20 of FIG. 1. The light communication circuit is structured to receive encoded light pulses. In this case, the light source 10 may be driven to provide encoded light pulses to the smart sensor 20. The encoded light pulses may include information for configuring parameters of the smart sensor 20.

The state of the signal output by the detection circuit 36 is based on the light circuit's 34 detection of light. When the light circuit 34 detects encoded light pulses, the signal output of the detection circuit 36 will also be encoded. The control unit 40 receives the signal output from the detection circuit 36. The control unit 40 is structured to decode the signal output of the detection circuit 36 and to use the decoded information to configure parameters of the smart sensor 20. The control unit 40 may include any suitable circuitry (e.g., without limitation, a processor, a field programmable gate array, a complex programmable logic device, or any other suitable analog or digital circuitry) to decode the signal output of the detection circuit 36 and to configure parameters of the smart sensor 20. It is also contemplated that the control unit 40 may be configured to allow changes to the configuration of the smart sensor 20 in response to receiving a predetermined encoded pattern. Thus, a pattern of light pulses can be used similar to a password or login to access the configuration of the smart sensor 20.

When the light communication circuit of FIG. 3 is employed in the smart sensor 20 of FIG. 1, a technician can configure the smart sensor 20 without getting close to it. Additionally, the light communication circuit allows the smart sensor 20 to be configured without the use of an external wireless device.

FIG. 4 is a circuit diagram of a light detection circuit in accordance with an example embodiment of the disclosed concept. The circuit diagram of FIG. 4 shows one example of a suitable configuration of components that may be employed in the function selection circuit 32 and light circuit 34 of FIGS. 2 and 3.

The light circuit 34 includes three LEDs 22 which may be disposed on the outside of a smart sensor 20, as shown for example in FIG. 1. Although three LEDs 22 are shown in FIG. 4, it will be appreciated that any number of LEDs may be employed without departing from the scope of the disclosed concept. The LEDs 22 each include an anode 23 and a cathode 24.

The function selection circuit 32 includes a function control signal generator 54 that generates a function control signal. The function selection circuit 32 also includes three n-channel MOSFETs 50 and a p-channel MOSFET 52. When the function control signal is high, the n-channel MOSFETs 50 are closed and the p-channel MOSFET 52 is open. This brings the anode 23 of the LEDs 22 to ground which allows them to operate to detect light and output a detection signal to the detection circuit 36. When the function control signal is low, the p-channel MOSFET 52 is closed and the n-channel MOSFETs 50 are open. This brings the cathodes 24 of the LEDs 22 to ground which allows the LEDs 22 to operate to generate light under control of the light control circuit 30.

Figure 5:
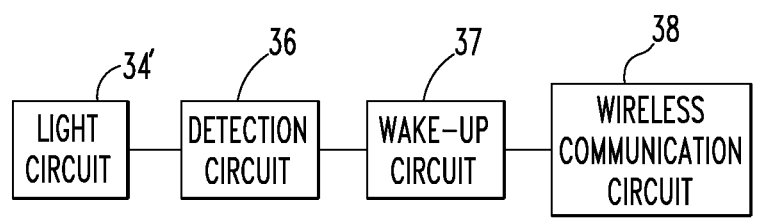
FIG. 5 is a schematic diagram of a light activated wireless communication circuit in accordance with an example embodiment of the disclosed concept.

FIG. 5 is a schematic diagram of a light activated wireless communication circuit in accordance with an example embodiment of the disclosed concept. The light activated wireless communication circuit includes a light circuit 34' which is structured to detect light. The light activated wireless communication circuit of FIG. 5 also includes the detection circuit 36, the wake-up circuit 37, and the wireless communication circuit 40, which have been previously described with respect to light activated wireless communication circuit of FIG. 2. The light activated wireless communication circuit of FIG. 5 may be employed in the smart sensor 20 of FIG. 1.

The light activated wireless communication circuit of FIG. 5 is similar to the light activated wireless communication circuit of FIG. 2, except that the light control circuit 30 and the function selection circuit 32 are omitted. Also, the light circuit 34' need only be capable of detecting light, rather than being capable of both generating and detecting light. However, it is contemplated that a device employing the light activated wireless communication circuit of FIG. 5 may have an additional circuit dedicated to generating light such as, without limitation a light control circuit 30 and associated light source.

The light circuit 34' may include one or more LEDs or other components capable of detecting light. In response to detecting light, the light circuit 34' outputs a detection signal. The detection signal is received by the detection circuit 36. The detection circuit 36 may perform any processing on the detection signal (e.g., without limitation, amplification, level shifting, etc.) to make it suitable for use in any subsequent circuitry.

The wake-up circuit 37 is configured to receive the signal from the detection circuit 36. In response to receiving the signal from the detection circuit 36, the wake-up circuit 37 outputs a wake-up signal to the wireless communication circuit 38 to activate the wireless communication circuit 38. It is also contemplated that the wake-up circuit 37 may be configured to wake-up the wireless communication circuit 38 in response to receiving a predetermined encoded pattern. Thus, a pattern of light pulses can be used similar to a password or login to activate the wireless communication circuit 38.

The wireless communication circuit 38 is configured to wirelessly communicate with an external wireless device. The wireless communication circuit 38 is generally powered off. The wake-up signal from the wake-up circuit 37 causes the wireless communication circuit 38 to power on. Once the wireless communication circuit 38 is powered on, the external wireless device is able to communicate with it.

Figure 6:
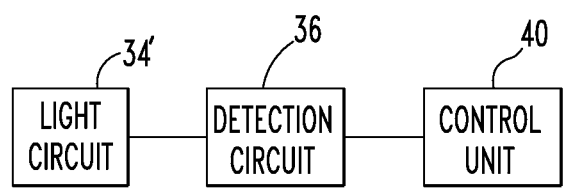
FIG. 6 is a schematic diagram of a light communication circuit in accordance with an example embodiment of the disclosed concept.

FIG. 6 is a schematic diagram of a light communication circuit in accordance with an example embodiment of the disclosed concept. The light communication circuit includes a light circuit 34' which is structured to detect light. The light communication circuit of FIG. 6 also includes the detection circuit 36 and the control unit 40, which have been previously described with respect to light communication circuit of FIG. 3. The light communication circuit of FIG. 3 may be employed in the smart sensor 20 of FIG. 1.

The light communication circuit of FIG. 6 is similar to the light communication circuit of FIG. 3, except that the light control circuit 30 and the function selection circuit 32 are omitted. Also, the light circuit 34' need only be capable of detecting light, rather than being capable of both generating and detecting light. However, it is contemplated that a device employing the light communication circuit of FIG. 6 may have an additional circuit dedicated to generating light such as, without limitation a light control circuit 30 and associated light source.

The light communication circuit of FIG. 6 is structured to receive encoded light pulses. In this case, the light source 10 may be driven to provide encoded light pulses to the smart sensor 20. The encoded light pulses may include information for configuring parameters of the smart sensor 20.

The state of the signal output by the detection circuit 36 is based on the light circuit's 34' detection of light. When the light circuit 34' detects encoded light pulses, the signal output of the detection circuit 36 will also be encoded. The control unit 40 receives the signal output from the detection circuit 36. The control unit 40 is structured to decode the signal output of the detection circuit 36 and to use the decoded information to configure parameters of the smart sensor 20. The control unit 40 may include any suitable circuitry (e.g., without limitation, a processor, a field programmable gate array, a complex programmable logic device, or any other suitable analog or digital circuitry) to decode the signal output of the detection circuit 36 and to configure parameters of the smart sensor 20. It is also contemplated that the control unit 40 may be configured to allow changes to the configuration of the smart sensor 20 in response to receiving a predetermined encoded pattern. Thus, a pattern of light pulses can be used similar to a password or login to access the configuration of the smart sensor 20.

Although the disclosed concept is described in relation to the smart sensor 20, it will be appreciated by those having ordinary skill in the art that the disclosed concept may be employed in other applications. For example and without limitation, the disclosed concept may be employed in other types of electronic devices for light-based activation or communication. For example and without limitation, the disclosed concept may also be employed in control, reclosers, transformers, or other types of electronic devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electronic device comprising:
   a component; and
   a light circuit including a light emitting diode and being structured to have a first mode to generate light with the light emitting diode and a second mode to detect light with the light emitting diode;
   a function selection circuit structured to control the light circuit to operate in the first mode or the second mode; and
   a light control circuit structured to drive the light circuit to generate light with the light emitting diode when operating in the first mode,
   wherein the light circuit is structured to output a detection signal in response to detecting light when operating in the second mode, and
   wherein the detection signal is used to wake up or communicate with the component.

2. The electronic device of claim 1, further comprising:
   a wake-up circuit structured to receive the detection signal and to output a wake-up signal in response to receiving the detection signal,
   wherein the component is a wireless communication circuit structured to receive the wake-up signal and to wirelessly communicate with an external wireless device, and
   wherein the wireless communication circuit is structured to wake-up in response to receiving the wake-up signal.

3. The electronic device of claim 2, wherein the wake-up circuit is structured to output the wake-up signal when the detection signal matches a predetermined pattern.

4. The electronic device of claim 2, wherein the wireless communication circuit is structured to wirelessly communicate with the external wireless device using Bluetooth or cellular communication protocol.

5. The electronic device of claim 1, wherein the component is a control unit structured to receive the detection signal; wherein the light circuit is structured to detect encoded light pulses including information; and wherein the control unit is structured to decode the detection signal.

6. The electronic device of claim 5, wherein the control unit is structured to use the decoded detection signal to configure parameters of the electronic device.

7. The electronic device of claim 1, further comprising:
   a detection circuit structured to receive the detection signal from the light circuit and to process the detection signal.

8. The electronic device of claim 7, wherein the detection circuit is structured to process the detection signal by at least one of amplifying and level-shifting the detection signal.

9. The electronic device of claim 1, wherein the function selection circuit ties a cathode of the at least one light emitting diode to ground when the light circuit is operating in the first mode and ties the anode of the light emitting diode to ground when the light circuit is operating in the second mode.

10. The electronic device of claim 9, wherein the function selection circuit includes a function control signal generator structured to output a function control signal having a first state or a second state, wherein the function selection circuit includes a first switch disposed between the cathode of the light emitting diode and ground and a second switch disposed between the anode of the light emitting diode and ground, and wherein the first switch and the second switch are controlled by the function control signal.

11. The electronic device of claim 10, wherein when the function control signal has the first state, the first switch is open and the second switch is closed, and when the function control signal has the second state, the first switch is closed and the second switch is open.

12. The electronic device of claim 1, wherein the electronic device is a smart sensor.

13. The electronic device of claim 1, wherein the light circuit is structured to detect light from a laser.

14. A method to wake up or communicate with a component of an electronic device, the method comprising:
   providing the electronic device having a light circuit including a light emitting diode and being structured to have a first mode to generate light with the light emitting diode and a second mode to detect light with the light emitting diode;
   selecting the first mode of the light circuit;
   generating light with the light circuit using the light emitting diode;
   selecting the second mode of the light circuit;
   detecting light with the light circuit using the light emitting diode; and
   waking up or communicating with the component based on the detected light.

15. The method of claim 14, wherein the component is a wireless communication circuit; wherein waking up or communicating with the component includes waking up the wireless communication circuit; and wherein the method further comprises:
   wirelessly communicating with an external wireless device using the wireless communication circuit.

16. The method of claim 14, wherein waking up the wireless communication circuit includes waking up the wireless communication circuit in response to detecting a light pattern matching a predetermined pattern.

17. The method of claim 14, wherein the light detected by the light circuit is encoded light pulses including information, and wherein the method further comprises:
   decoding the detected light with a control unit included in the electronic device.

18. The method of claim 17, further comprising:
   using the decoded detected light to configure parameters of the electronic device.

* * * * *